United States Patent [19]

Coldren

[11] 3,995,879
[45] Dec. 7, 1976

[54] WAGON TONGUE CONSTRUCTION

[75] Inventor: Kenneth M. Coldren, Fort Wayne, Ind.

[73] Assignee: M & W Gear Company, Gibson City, Ill.

[22] Filed: July 30, 1975

[21] Appl. No.: 600,204

[52] U.S. Cl. .............................................. 280/489
[51] Int. Cl.² ......................................... B60D 1/16
[58] Field of Search ................ 280/478 R, 483, 489

[56] References Cited
UNITED STATES PATENTS

| | | | |
|---|---|---|---|
| 2,448,436 | 4/1948 | Jones | 280/489 |
| 2,452,710 | 11/1948 | Allen | 280/489 |
| 2,540,677 | 2/1951 | Kandt et al. | 280/489 X |
| 3,534,981 | 10/1970 | Moulton | 280/489 X |

*Primary Examiner*—M. H. Wood, Jr.
*Assistant Examiner*—R. Schrecengost
*Attorney, Agent, or Firm*—Allegretti, Newitt, Witcoff & McAndrews

[57] ABSTRACT

An improved tongue support device comprises a cantilever leaf spring positioned within the tongue member attached to a wagon. A second tongue member is biased upwardly by the leaf spring about a pivot axis connecting the first and second tongue members.

3 Claims, 2 Drawing Figures

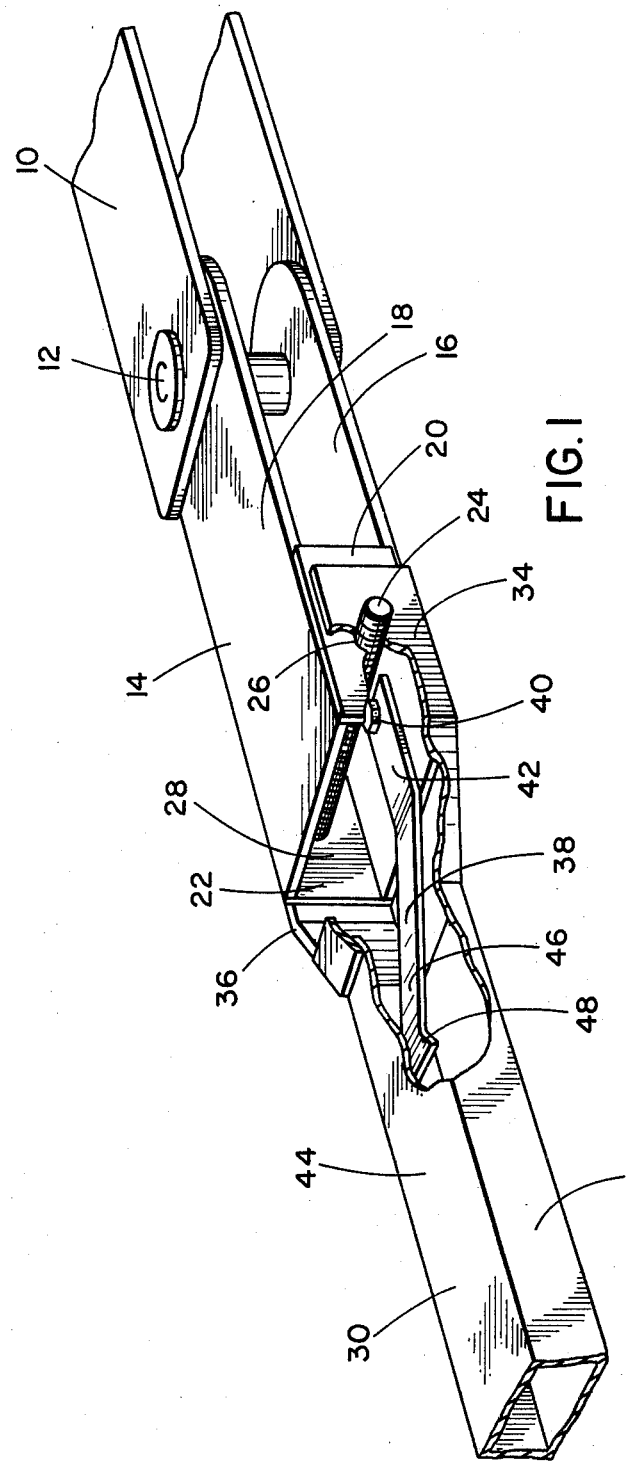
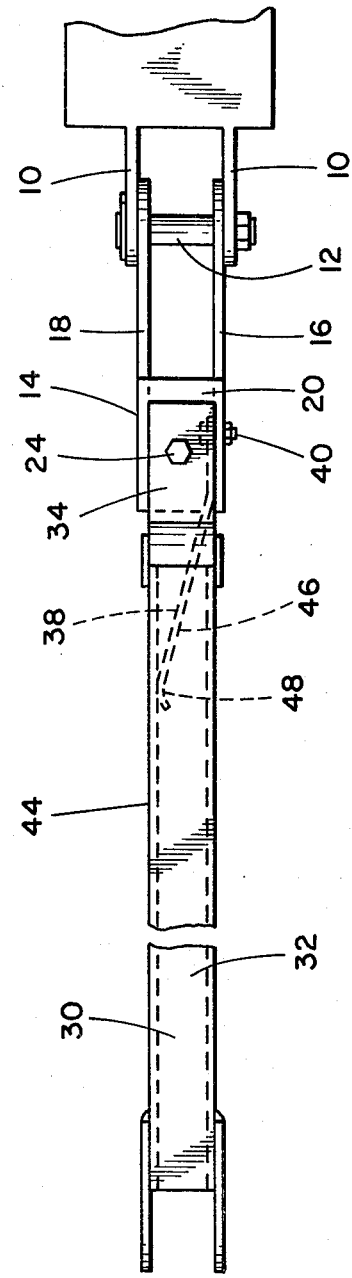

WAGON TONGUE CONSTRUCTION

BACKGROUND OF THE INVENTION

In a principal aspect, the present invention relates to an improved tongue support device, particularly for wagons, trailers and the like.

Modern farm machinery and equipment as well as other trailers and similar equipment are towed by a pulling vehicle to which they are attached by means of a wagon tongue. Because of the size of modern equipment, the tongue may be extremely heavy. As a result, it is often quite difficult to raise and maneuver the tongue in a desirable fashion during "hook-up" operations.

To assist movement of wagon tongues, a past practice has been to attach a coil spring or pulley line between the tongue and the wagon. In this manner, the tongue may be elevated normally or biased upwardly by the force of the coil spring.

While such an arrangement is quite workable, the pulley or coil spring is exposed and does provide a potential danger inasmuch as it may become fouled or snagged or may interfer with the operation of the wagon or the vehicle pulling the wagon. The present invention provides an improvement which seeks to avoid the noted prior art problems.

SUMMARY OF THE INVENTION

Briefly, the tongue support device of the present invention includes a first tongue member attached to the wagon. A second tongue member is pivotally attached to the first tongue section and pivots substantially about a horizontal axis. A cantilever leaf spring is attached to the first member and projects into engagement with the second member to bias the second member about the pivot axis connection. In this manner, the tongue may be normally biased to a position which will facilitate hitching the wagon to a pulling vehicle.

Thus, it is an object of the present invention to provide an improved tongue support device.

It is a further object of the present invention to provide an improved tongue support device which remains relatively unexposed yet continuously operable.

Still another object of the present invention is to provide a tongue support device which is easily repaired or replaced.

One further object of the present invention is to provide a support tongue device which cannot be easily snagged or fouled.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a cut-away perspective view illustrating the improved tongue support device of the present invention; and FIG. 2 is a side elevation of the tongue support device of the present invention shown in FIG. 1.

DESCRIPTION OF THE PREFERRED EMBODIMENT

Referring to the Figures, a tongue arrangement for a wagon or other vehicle may include an attachment bracket 10 with a vertical pivot shaft 12. Attached to the shaft 12 is a first tongue member of section 14. Section 14 includes vertically spaced, parallel plates 16 and 18 which are maintained in spaced relation by side plates 20 and 22 welded thereto. A pivot rod or shaft 24 projects through openings 26 in side plates 20 and 22.

A second tongue member or section 30 is pivotally attached to the first section 14 by means of the shaft or pivot axis 24. Normally, the pivot axis or shaft 24 is a horizontal shaft generally parallel with the ground. The second section 30 is comprised of a forward tow bar or box beam 32. Welded side plates 34 and 36 connect to beam 32 and telescope over plates 20, 22. Plates 34, 36 are generally parallel to one another and spaced from one another so as to cooperate with shaft 24. In this manner, the second section 30 is connected to section 14 and pivots about the horizontal axis defined by shaft 24 of first section 14.

The improvement of the present invention includes a cantilever steel spring 38 attached by at least one bolt 40 to the lower plate 16 of the first section 14. The spring 38 includes a first planar section 42 which fits tightly against lower plate 16 within the region defined by the plates 16, 18, 20 and 22. The spring 38 is formed to project outwardly and upwardly. Spring 38 thereby slidably engages the surface inside an upper plate 44 of beam 32. Preferably, the spring 38 thus includes an upwardly inclined run 46 and terminates with a slightly curled end 48. The end 48 slidably engages plate 44. The spring 38 has a width and thickness determined by the weight of tongue member 30. Thus, either the width or thickness of spring 38 may be increased to compensate for increased tongue member 30 weight.

The spring 38 acts to bias the tongue member 30 in the clockwise direction as viewed in FIGS. 1 and 2. In this manner, with the proper choice of spring tension and size, it is possible to maintain the tongue 30 in a substantially horizontal or upraised position. Moreover, it is much easier to lift the tongue 30 since the spring 38 acts as an assist to carry part of the weight of tongue. This becomes an important consideration on modern farm equipment wherein tongues associated with large wagons approach 100 pounds in weight. Note also that alternative shapes are possible for the cantilever spring 38. Thus, the spring 38 may have a variable width and thickness along its length. Also, the spring 38 may include additional spring leaf members to increase the spring force. It is also possible to provide the spring action to the cantilever beam by means of a separate spring (not shown) such as a coil spring acting on one end of a lever arm with the other end engaging tongue member 30.

Thus, it can be seen that the improvement of the present invention provides a spring mechanism which is entirely enclosed and protected from the environment and from interference with operation of the equipment. On the other hand, the spring provides a valuable assist in movement of a tongue associated with a vehicle. Therefore, it is to be understood that the subject matter of the invention shall be limited only by the following claims and their equivalents.

What is claimed is:

1. A tongue support device comprising in combination:

a first tongue member attached to a vehicle and projecting therefrom, said first tongue member defining an open ended enclosure with a bottom inside surface;

a substantially horizontal axis through said first tongue member at the open end and above the bottom inside surface of the enclosure;

a second tongue member including opposed spaced vertical plate members projecting over the first tongue members and pivotally connected thereto at the horizontal axis, said second tongue member also including an open ended enclosure in opposed relation with the open ended enclosure of the first tongue member, said open ended enclosure of said second tongue member including a top inside surface;

and a cantilever, leaf spring means rigidly attached to said first tongue member at the bottom inside surface below the horizontal axis, projecting in sliding engagement with the top inside surface of said second tongue member to bias said second tongue member against the force of gravity about the axis of interconnection between said members.

2. The device of claim 1 wherein the first tongue member is attached by means of a vertical pivot to a vehicle.

3. The device of claim 1 wherein the tongue members each have a rectangular cross section.

* * * * *